No. 683,619. Patented Oct. 1, 1901.
G. W. OSBORNE.
ROTARY ENGINE.
(Application filed Dec. 21, 1900.)

(No Model.) 3 Sheets—Sheet 2.

No. 683,619. Patented Oct. 1, 1901.
G. W. OSBORNE.
ROTARY ENGINE.
(Application filed Dec. 21, 1900.)
(No Model.) 3 Sheets—Sheet 3.
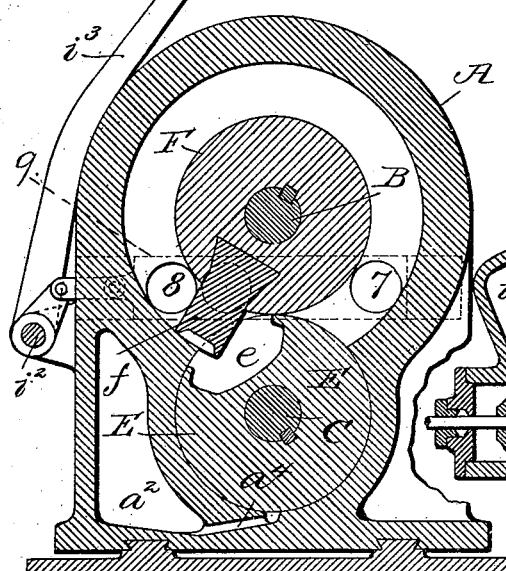
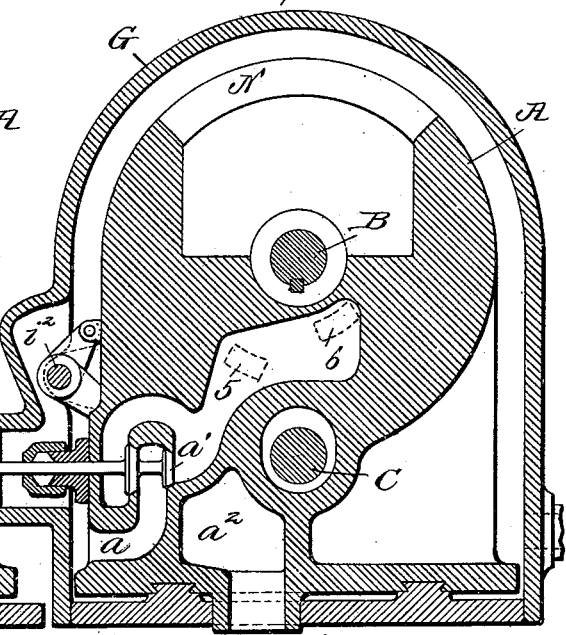
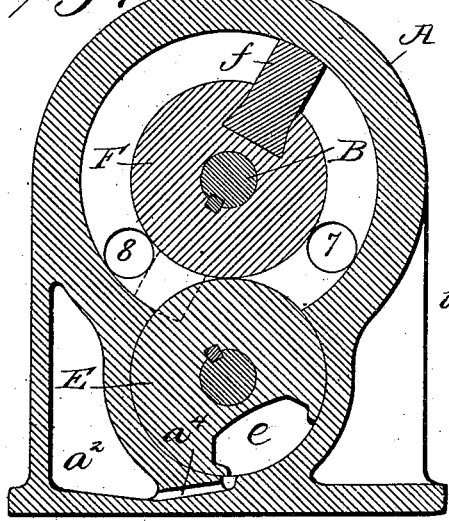
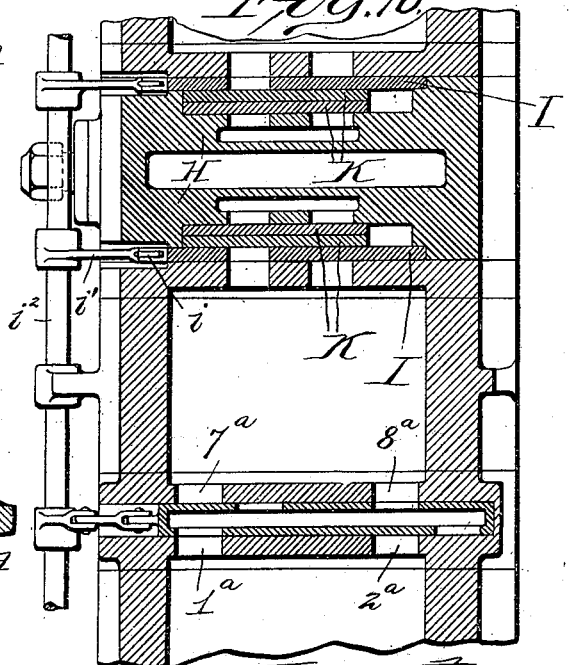
Inventor:
Guy Wood Osborne,
by Bakewell & Cornwall
Attys.
Attest:

UNITED STATES PATENT OFFICE.

GUY W. OSBORNE, OF ST. LOUIS, MISSOURI.

ROTARY ENGINE.

SPECIFICATION forming part of Letters Patent No. 683,619, dated October 1, 1901.

Application filed December 21, 1900. Serial No. 40,637. (No model.)

*To all whom it may concern:*

Be it known that I, GUY W. OSBORNE, a citizen of the United States, residing at the city of St. Louis, in the State of Missouri, have invented a certain new and useful Improvement in Rotary Engines, of which the following is a full, clear, and exact description, such as will enable others skilled in the art to which it appertains to make and use the same, reference being had to the accompanying drawings, forming a part of this specification, in which—

Figure 1:
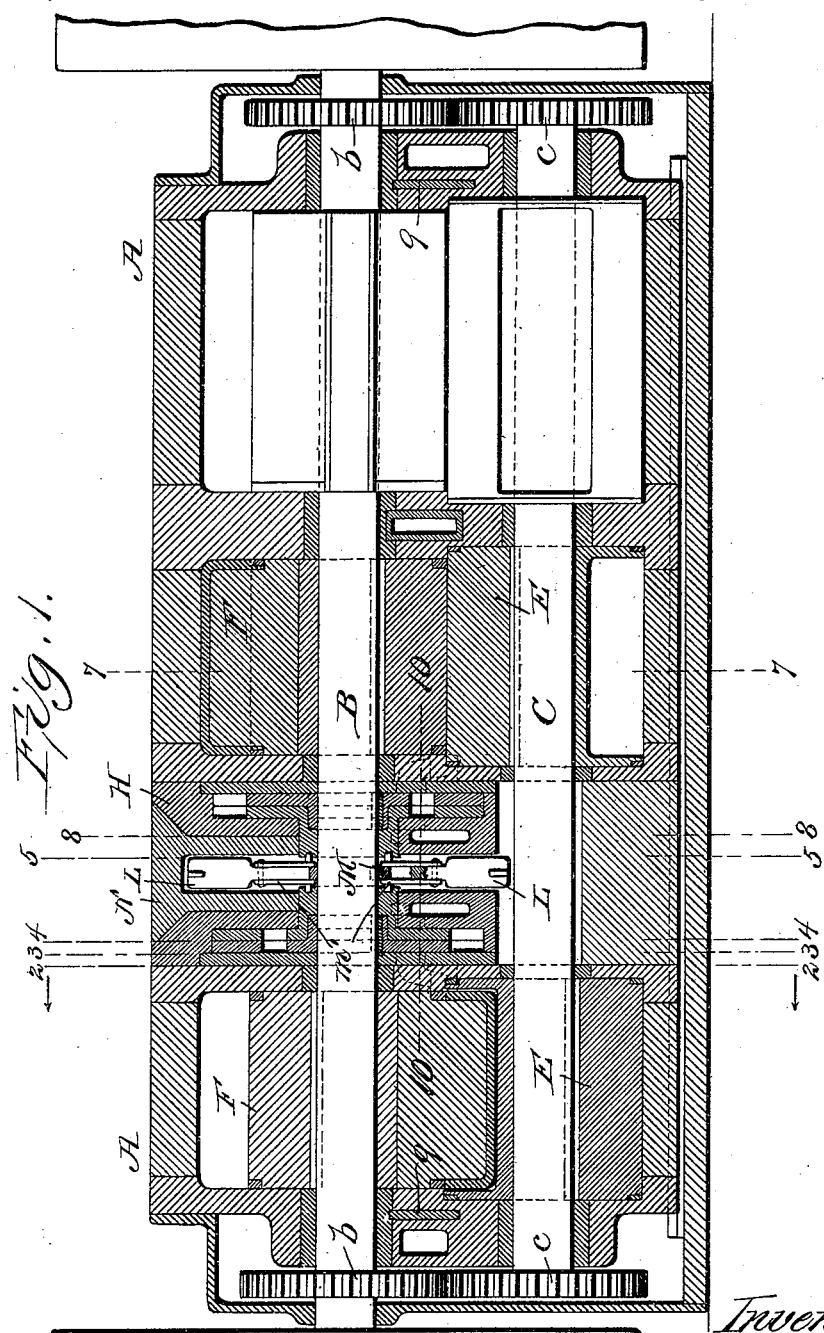
Figure 2:
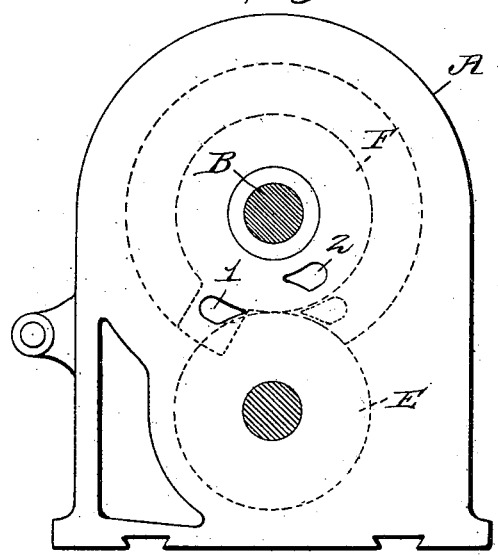
Figure 3:
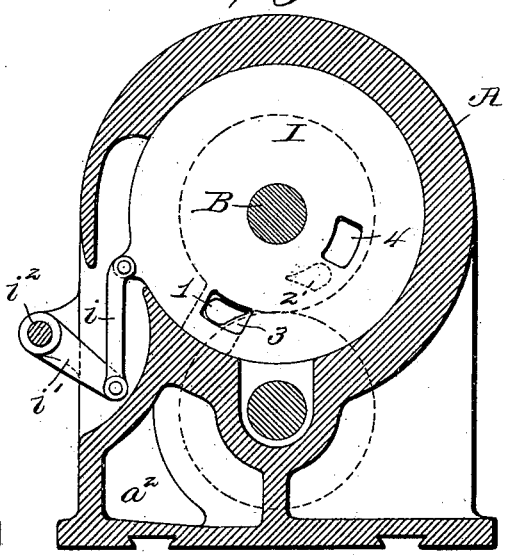
Figure 4:
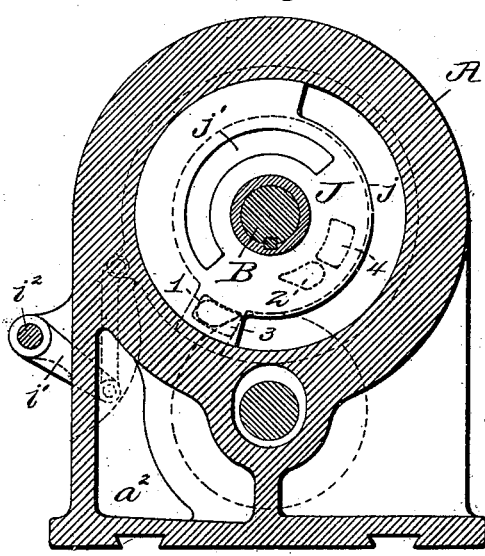
Figure 5:
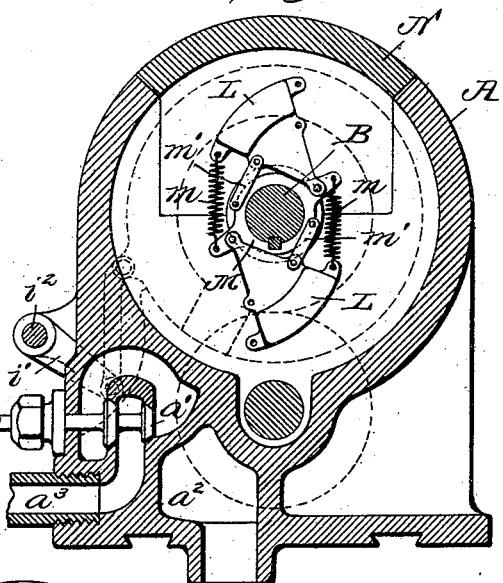
Figure 6:
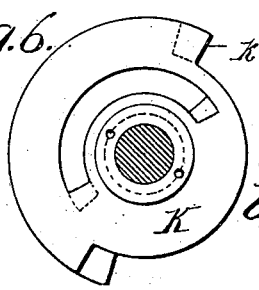

Figure 1 is a horizontal sectional view through my improved rotary engine. Fig. 2 is a vertical sectional view on line 2 2, Fig. 1. Fig. 3 is a vertical sectional view on line 3 3, Fig. 1. Fig. 4 is a vertical sectional view on line 4 4, Fig. 1. Fig. 5 is a vertical sectional view on line 5 5, Fig. 1. Fig. 6 is a detail view of the fixed and adjustable disk valves for controlling the admission of steam to the cylinder. Fig. 7 is a vertical sectional view on line 7 7, Fig. 1. Fig. 8 is a vertical sectional view on line 8 8, Fig. 1. Fig. 9 is a view corresponding to Fig. 7, showing the movable parts in a different position. Fig. 10 is a horizontal sectional view on line 10 10, Fig. 1; and Fig. 11 is a detail view showing the plunger in the act of passing the rotary abutment.

This invention relates to a new and useful improvement in rotary engines, the object being to construct a device of the character described whereby the cylinders may be compounded.

Another object is to simplify the construction of a rotary engine, making the same compact and easy of assemblage and repair.

With these objects in view the invention consists in the construction, arrangement, and combination of the several parts, all as will hereinafter be described and afterward pointed out in the claims.

In the drawings, A indicates the cylinders arranged on a suitable base, said cylinders having appropriate heads or partitions, as will hereinafter be described.

B indicates a shaft axially arranged with respect to the cylinders and passing therethrough, said shaft carrying appropriate fly and pulley wheels at its ends, as seen in Fig. 1. Shaft B has a gear $b$ mounted thereon near one end, which meshes with a gear $c$, mounted on a shaft C, the shaft C being speeded to correspond in its rotation with the rotation of shaft B. Shaft C carries or has geared to it what I will designate as "rotary abutments," said abutments being arranged in the vertical plane of the several cylinders and being mounted in suitable chambers, so as to protrude into the cylinders of the engine. These abutments are shown more clearly in Figs. 1, 7, 9, and 11, they consisting of a cylindrical light body portion fitting snugly at the ends and peripheries in their respective chambers, the peripheries of said abutments, which are marked E in the drawings, being provided with pockets or recesses $e$ for coöperating with their respective piston-heads $f$. These piston-heads are mounted on rotary pistons F, keyed to the shaft B, said rotary pistons occupying the cylinders in which they are mounted, fitting snugly therein and provided with suitable packing, the piston-head extending radially therefrom and engaging the inner periphery of the cylinder, practically closing the space between the piston and cylinder.

The casting A, which I have designated as the "cylinder-casting," is preferably cored or formed with suitable passages for the admission and exhaust of steam from the several cylinders. The inlet-port is preferably located at $a$, being controlled by a suitable throttle-valve $a'$, while the exhaust-port is designated by $a^2$, this exhaust-port communicating with the respective exhaust-passages from the cylinders. The inlet-port may directly communicate with a pipe $a^3$, leading from some suitable source of steam-supply, as shown in Fig. 5, or if an inclosing casing G is employed to surround the cylinders steam may be admitted within the inclosing casing and then taken from said casing into the passage $a$, as shown in Fig. 8. By referring to Fig. 7 it will be noted that a passage $a^4$ leads from the bottom of the chamber containing the rotary abutment to the exhaust-passage in order that any water of condensation collecting in the pocket E, together with the steam in said pocket, may be conducted to the exhaust-passage.

Referring now to Figs. 1 and 10, H indicates a removable valve-casing designed to fit between the two primary cylinders of my engine. These two so-called "primary cylinders" are those in which steam is initially admitted from the valve, and beyond or on the outside of said cylinders a secondary or compound cylinder may be arranged, one being shown to the right in Fig. 1 for receiving the exhaust-steam from its adjacent primary cylinder, and thus making a compound engine. Of course it will be understood that another compound cylinder shall be arranged to the extreme left, as shown in Fig. 1, to take the exhaust-steam from its respective primary cylinder to increase the efficiency of the engine. It will also be understood that any number of compound or low-pressure cylinders may be employed, if desired, and worked on the same principles.

In describing the valve mechanism for admitting steam to the primary cylinders I will refer to the mechanism for admitting steam to the primary cylinder at the left in Fig. 1, it being understood that this description also applies to the admission of steam to the primary cylinder at the right in said figure.

Referring to Fig. 2, 1 and 2 indicate two ports leading through the cylinder-head and opening into the cylinder at approximately the same radial distance from the shaft B, passage 2, however, being inclined so that its outer port opens through the face of the cylinder-head nearer the shaft B. These ports are controlled by a disk valve I, loosely mounted on shaft B and provided with openings 3 and 4, (see Fig. 3,) one of which is designed to register with the inlet-ports through the cylinder-head when said disk valve is in either of its two positions. This disk valve is utilized for reversing the engine and is controlled by a link $i$, operated by a rock-arm $i'$ of a rock-shaft $i^2$, said rock-shaft being mounted in suitable bearings and being provided with an operating-handle $i^3$. (See Fig. 7.)

Fixedly mounted on the shaft B, adjacent the disk valve I, is a disk cut-off valve J, (see Fig. 4,) which has its periphery reduced, as at $j$, throughout a portion of its circumference for the purpose of opening and closing the aperture 3 in the disk valve I and when said aperture is in registration with the port 1 admitting and cutting off steam through said port. This rotary cut-off valve is also provided with a concentric opening $j'$, designed to admit and cut off steam through the aperture 4 in the disk valve I for a similar purpose when the engine is running in the opposite direction.

K indicates a governor-controlled cut-off valve (see Fig. 6) which corresponds to the cut-off valve J, with this exception, that cut-off valve K has an independent rotary movement on the shaft B, which movement is controlled by weights L, the position of said weights being influenced by centrifugal force.

M indicates a collar keyed to the shaft B and to which the weights L are pivoted. These weights are held close to the shaft through means of springs $m$, centrifugal force overcoming the tension of said springs and throwing the weights outwardly when the speed of the shaft reaches or exceeds a certain predetermined maximum.

$m'$ indicates links connecting the weights with the adjustable cut-off valve K, so that when the weights L are thrown outwardly said cut-off valve K, which normally occupies a position corresponding to the position of the valve J, will be circumferentially displaced, so as to delay the opening of the ports in the valve-casing H. It will also be understood that if the collar M is moved around to a certain angle, so as to give valve K a certain lead over valve J, the valve would cut off steam at any fraction of a revolution.

By referring to Fig. 8 it will be seen that the valve-casing H is a casting formed in one piece, in the sides of which are recesses or openings, forming valve-seats, against which the disk valves are seated. The central space in this casting provides a chamber, in which the governor rotates, and the openings for the admission and exhaust of steam are cored out, as shown. There is a plug or cap N for covering the governor-space, which cap can be removed to give access to the governor. The inlet-port $a$, before referred to, branches, so as to pass on each side of the governor-chamber, and from these branches, one of which is shown in Fig. 8, are ports 5 and 6, preferably arranged opposite the ports 1 and 2. These ports 5 and 6 are controlled by the cut-off valve K, which, as before described, is adjustable on the shaft B and, depending upon the speed of said shaft, is circumferentially displaced relative to the cut-off valve J, which latter controls the passage of steam through the aperture 3 or 4, and consequently inlet-ports 1 or 2, which lead into the engine-cylinder. When the speed of the shaft increases to such an extent that the governor-weights operate the cut-off valve K, it will be observed that the shoulder $k$ advances with respect to the corresponding shoulder on cut-off valve J, so that if the engine is rotating in the direction of the arrows this shoulder $k$ will close the port 5 in advance of the corresponding shoulder on the cut-off valve J closing the port 3, which is equivalent to cutting off that much steam from the engine. The valve J being fixed to the shaft will admit steam under any and all circumstances at the proper time behind the piston F in order that said piston may be forced around in the desired direction. This admission of steam behind the piston under normal conditions is continuous until the shoulders on valves J and K close ports 5 and 3. If the speed of the engine is increased to such an extent as to advance the cut-off valve K so that its shoulder $k$ will close the port 5 in advance of the closure of port 1, it follows that the admission of steam to the cylinder through port 1 is correspondingly shortened. When the steam is first admitted behind the piston F, the rotary abutment E bears against the cylindrical portion of the piston, closing the cylinder between the point of admission of the steam and the exhaust-port. This abutment has a rolling contact with the rotary portion of the piston, effecting such closure until such time as the piston-head $f$ reaches the exhaust-port, which is marked 7, about which time the admission of steam is cut off through the port 1. The pocket $e$ is now in such position as to receive the piston-head, as shown in Fig. 11, and after said piston-head has passed out of said pocket, as shown in Fig. 7, and is ready to again receive steam therebehind the abutment contacts with the rotary portion of the piston to effect a closure between the point of admission of the steam and the exhaust-port 7. The exhaust-port 7 opens into a sliding valve 9 and communicates with the exhaust-passage $a^2$, before described. The position of valve 9 is controlled by the rock-shaft $i^2$, (see Fig. 10,) so that whenever said shaft is manipulated to effect a reversal of the engine by changing the point of admission of steam into the cylinders thereof the points of exhaust are likewise changed. Whenever the engine is running in the direction of the arrows in Fig. 7 the exhaust-port 7 is open and the exhaust-port 8 is closed. Assuming now that the lever $i^3$ is moved outwardly, so as to open exhaust-port 8 and close exhaust-port 7 to effect a reversal of the engine, this action of the lever would also close the inlet-port 1 and open the inlet-port 2 through the disk valve I. The operation of the engine under these conditions would be similar to that above described, it of course moving in an opposite direction. To work the governor successfully when the engine is running in such opposite direction, it will be necessary to throw the governor-weights over and link them to the collar of the valve K, so that the outward movement of the governor-weights will move said valve in the proper direction. Of course this arrangement also contemplates changing the connection of the springs $n$ with respect to the governor-weights, the apertures for the connection of said springs in such changed position and for the connection of the links, respectively, being shown in Fig. 5. Where the engine is employed as a stationary engine, where a reverse is seldom desired, it follows that little difficulty will be experienced in changing the governor, because its use in a reverse is so infrequent. Where reverses are frequent, it is obvious that this governor mechanism is so constructed as to adapt itself when the engine is running in either direction, requiring but little or no change in the details of construction thereof.

Referring to Fig. 10, wherein I have illustrated a compound cylinder taking its steam from the exhaust of one of the primary cylinders, it will be observed that the exhaust-port $7^a$ of the primary cylinder is closed, while the exhaust-port $8^a$ of said cylinder is open. The exhaust-valve in this structure is hollow, so that the inlet-port $1^a$ is open, and in order to drive the piston in the compound cylinder in the same direction as the piston in the primary cylinder is driven this inlet-port $1^a$ is arranged at a point diagonally opposite the exhaust-port $8^a$. If this hollow exhaust-valve were moved forwardly, so as to take the exhaust from the port $7^a$, the ports $8^a$ and $1^a$ would be closed and the diagonally opposite inlet-port $2^a$ of the compound cylinder would be open. Of course the compound cylinder is provided with exhaust-ports controlled by a valve similar to the valve 9, before described. The piston-heads in the two primary cylinders are preferably oppositely disposed, so as to avoid positions of dead-center in the engine, and the piston-heads in the compound cylinders are circumferentially displaced about sixty degrees behind their respective primary pistons, or that distance which is idly traveled by the primary piston-head in passing beyond its exhaust-port, through the pocket in the rotary abutment, and to the position where it again takes steam. It will of course be understood that the pressure of steam in the primary cylinder when the piston-head is in the position shown in Fig. 11 is substantially equal throughout, and this pressure is utilized in advancing the piston in the secondary cylinder. When live pressure is admitted behind the piston-head of the primary cylinder, the steam in advance of said cylinder is being forced out through the exhaust-port of the primary cylinder and utilized in the secondary or compound cylinder, it escaping from said compound cylinder about the time the piston-head of the primary cylinder has made one-half a revolution from the point where it first receives steam.

Having thus described my invention, what I claim, and desire to secure by Letters Patent, is—

1. In a rotary engine, the combination with a plurality of pistons mounted on a common shaft, rockable disk valves having ports for admitting and exhausting pressure fluid, and a rock-shaft having suitable connections with said valves for moving the same simultaneously; substantially as described.

2. In a rotary engine, the combination with a cylinder, its shaft and piston, of an inlet-port leading into said cylinder, a rockable disk valve controlling said inlet-port, a cut-off valve coöperating with said disk valve, a governing device mounted upon said shaft and a governor-controlled cut-off valve; substantially as described.

3. In a rotary engine, the combination with a cylinder, shaft and piston, of an inlet-port leading into the cylinder, a rockable disk valve loosely mounted upon said shaft and having an aperture for controlling said inlet-port, a cut-off valve controlling the aperture through the disk valve, a governing mechanism mounted upon said shaft, a governor-controlled cut-off valve, and means for circumferentially displacing said auxiliary cut-off valve; substantially as described.

4. In a rotary engine, the combination with a cylinder, shaft and piston, of a rockable disk valve loosely mounted upon said shaft for controlling the inlet-port to the engine, a cut-off valve fixedly mounted upon the shaft for controlling the aperture in the disk valve, a governing mechanism and a governor-controlled cut-off valve rotatably mounted upon the shaft; substantially as described.

5. In a rotary engine, the combination with a cylinder, shaft and piston, of a rockable disk valve loosely mounted upon said shaft, a cut-off valve fixedly mounted upon said shaft for controlling an aperture through the disk valve, a valve-casing through which steam is admitted to the cut-off valve mounted upon said shaft, and a governor-controlled valve for controlling the inlet-port in the valve-casing; substantially as described.

6. In a reversible rotary engine, the combination with the cylinder, shaft and piston, of a plurality of inlet-ports, rockable disk valves mounted upon the shafts for controlling said ports, a cut-off valve fixedly mounted upon the shaft for controlling either of the cylinder inlet-ports opening through the disk valve, a governing mechanism and a governor-controlled valve mounted upon said shaft, said governor-controlled valve being independently movable relative to said shaft; substantially as described.

7. In a reversible rotary engine, the combination with the cylinder, shaft and piston, the cylinder having the inlet-ports 1 and 2, a disk valve mounted upon the shaft and having the apertures 3 and 4, means for rotating said disk valve, a cut-off valve J having the reduced portion $j$ and the concentric opening $j'$, and a governor-controlled valve having the radially-reduced portion and concentric opening corresponding with the similar parts of the valve J; substantially as described.

8. In a rotary engine, the combination with a primary cylinder, of a compound cylinder, a rockable disk valve having ports for controlling the admission of steam to the primary cylinder, a slidable valve for controlling the exhaust from the primary cylinder and the admission of such exhaust-steam into the compound cylinder, and means for operating said valves simultaneously; substantially as described.

9. In a rotary engine, the combination with a primary cylinder, its shaft and piston, of a compound cylinder having a piston mounted on the shaft of the primary cylinder, a rockable disk valve I, loosely arranged on said shaft for controlling the admission of steam to the primary cylinder, a governor-controlled disk valve K, loosely arranged on said shaft for regulating the amount of steam admitted to said primary cylinder, a disk valve J fixedly mounted upon said shaft, a slidable valve arranged between the primary and compound cylinders, and means for operating said valve I, and said slidable valve simultaneously for effecting a reversal of the engine and a transposition of the inlet and exhaust ports thereof; substantially as described.

10. A reversible rotary engine comprising the following elements in combination: a primary cylinder, a secondary or compound cylinder, a shaft common to both of said cylinders, pistons mounted on said shaft in the respective cylinders, a rockable disk valve I, a cut-off valve J fixedly secured to said shaft, a governor-controlled valve K, loosely mounted upon said shaft, and a hollow slide-valve interposed between the primary and secondary cylinders, said hollow slide-valve having suitable ports coöperating with the exhaust-ports in the primary cylinder and the inlet-ports of the secondary cylinder, whereby, when said valve is operated in effecting a reversal of the engine, one of the exhaust-ports from the primary cylinder is closed and the other of said ports is open, and the diagonally-arranged inlet-ports into the secondary cylinder are respectively open and closed; substantially as described.

In testimony whereof I hereunto affix my signature, in the presence of two witnesses, this 18th day of December, 1900.

GUY W. OSBORNE.

Witnesses:
GEORGE BAKEWELL,
H. L. AMER.